United States Patent [19]

Teel

[11] Patent Number: 4,980,868
[45] Date of Patent: Dec. 25, 1990

[54] SONAR SYSTEM

[75] Inventor: Willis A. Teel, Panama City, Fla.

[73] Assignee: The United States of America as represented by the Secretary of the Navy, Washington, D.C.

[21] Appl. No.: 413,403

[22] Filed: Nov. 2, 1973

[51] Int. Cl.$^5$ ............................................. G01S 15/00
[52] U.S. Cl. ....................................... 367/99; 367/904
[58] Field of Search .............. 340/3 D, 3 R; 343/7 A; 367/99, 97, 904, 900, 98, 90; 342/99

[56] References Cited

U.S. PATENT DOCUMENTS

| | | | |
|---|---|---|---|
| 3,202,960 | 8/1965 | Galbraith | 367/90 |
| 3,295,127 | 12/1966 | Kross | 342/99 |
| 3,525,976 | 8/1970 | Wilcox | 367/90 |
| 3,646,506 | 2/1972 | Suter | 367/97 |
| 3,663,932 | 5/1972 | Mount | 367/90 |

Primary Examiner—Thomas H. Tarcza
Assistant Examiner—Daniel T. Pihulic
Attorney, Agent, or Firm—Harvey David; John Becker; Sol Sheinbein

[57] ABSTRACT

A doppler compensated sonar system is disclosed as including a transmitter and a receiver. The receiver of the disclosed preferred embodiment is a single channel receiver which incorporates a mixer and a narrow pass band filter connected in series therein. A phase lock loop of the negative feedback type is connected between the control input and the output of said mixer which effectively determines the occurrence of any doppler effects being processed in said receiver channel and compensates therefor by appropriate adjustment of the frequency of the signal supplied to the control input of said mixer, thereby causing the remainder of said receiver channel, including said narrow band pass filter, to process received target signals without any doppler effects being present therein. When mounted on a fast moving marine vehicle, this doppler compensated sonar system aids considerably in the avoidance of floating logs, submerged tree stumps, and other hazardous objects and debris thereby during the navigation thereof through uncharted waters.

18 Claims, 1 Drawing Sheet

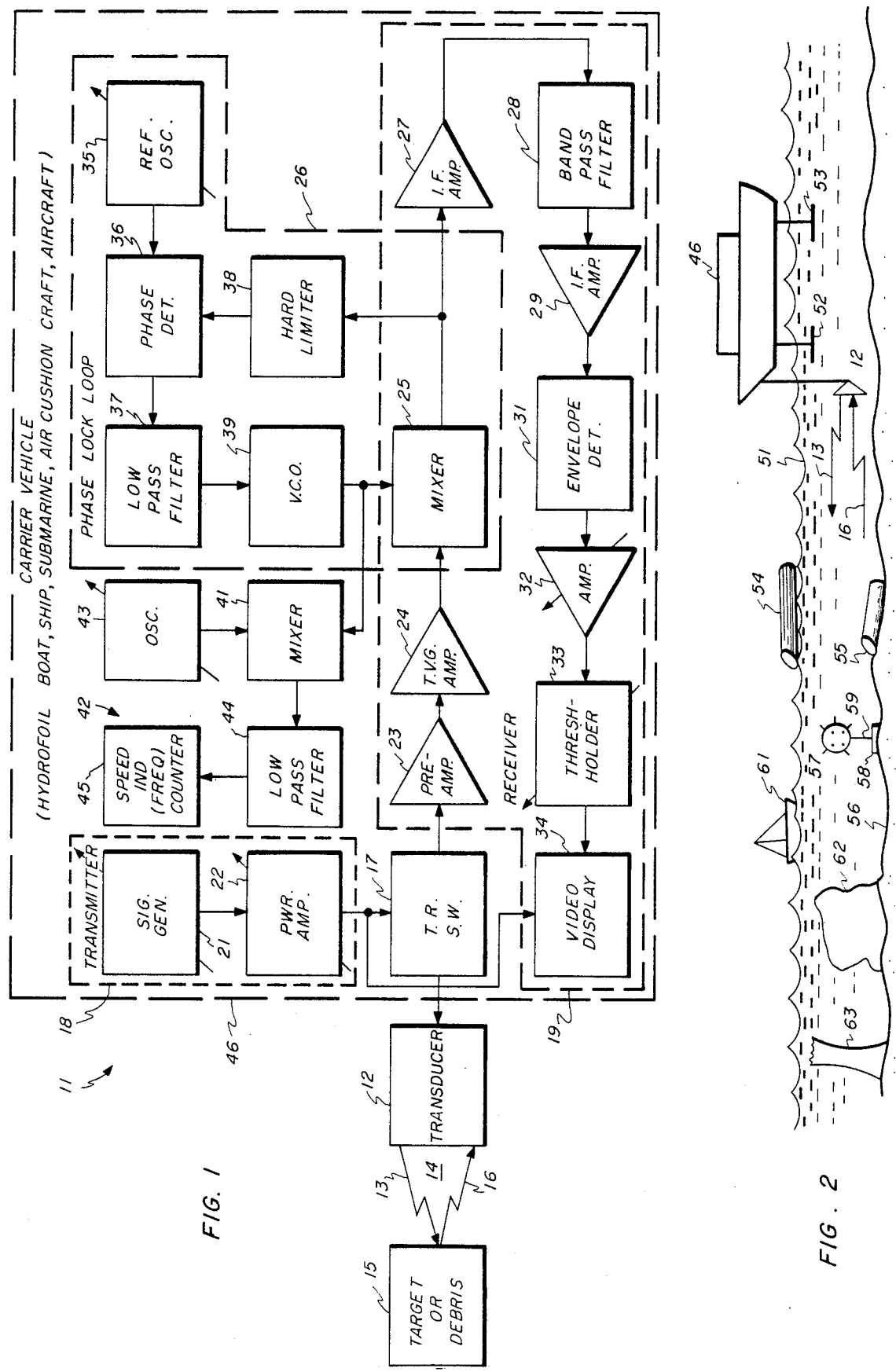

SONAR SYSTEM

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to echo-search-ranging systems for detecting targets, identifying them, and indicating the range thereto, and, in particular, it is a sonar system for detecting targets located within an aqueous medium, identifying them, and indicating the range thereto. In even greater particularity, the invention is an improved doppler-compensated sonar system that facilitates the avoidance of logs, submerged tree stumps, debris, and other hazards floating on the surface of or submerged within water by a fast moving vehicle running on, above, or below the surface thereof. A specific and most useful example of the latter is a high-speed hydrofoil boat avoiding otherwise unavoidable hazards as a result of incorporating and using the subject sonar invention as an adjunct to the other navigation instrumentation thereof.

DESCRIPTION OF THE PRIOR ART

Heretofore, conventional narrow band sonar systems have been employed to detect surface and subsurface hazards that could be encountered by water crafts during the running thereof. For instance, multi-channel sonar receivers operating in parallel using adjacent narrow band filters which are rapidly sampled have been used for such purpose. However, most thereof leave a great deal to be desired because of their complexity, cost, and insufficient reliability. Moreover, their accuracy is generally too poor to be useful with respect to high-speed boats, etc.; and when they are used, highly trained personnel are usually required to calibrate and operate them, if false target indications and observations are to be obviated.

SUMMARY OF THE INVENTION

The instant invention overcomes many of the disadvantages of the aforementioned prior art, in that it is rapid-acting, continuous in operation, relatively accurate, may be operated by people of little or no training, and due to its relative simplicity, is economical to manufacture, operate, maintain, and store. In addition, with only minor modifications, it is readily adaptable for use with practically all existing mobile platforms or vehicles, regardless of the ambient environment within which they operate. Of course, its non-navigation capabilities would be recognized by the artisans of other arts to which it could pertain, thereby increasing the possible applications thereof considerably. Two of such arts might, for instance, be material analysis and medical diagnosis.

Briefly, the subject invention is a method and means for reducing the noise bandwidth of a sonar system to the extent that it substantially corresponds to the received signal bandwidth, to thereby improve the signal-to-noise ratio thereof when operating from a high speed platform. So doing is accomplished by automatically tracking the doppler-shifted reverberation and compensating the received signal with a phase lock loop signal proportional thereto. The resulting effective narrow band operation has been found to improve the signal-to-noise ratio of the subject sonar system by a factor of 10 log of $$\left[ \frac{\text{doppler frequency change}}{\text{bandwidth}} \right].$$

It has also been determined that, concomitant with the aforesaid signal-to-noise improvement, the sonar of the subject invention provides, as a secondary benefit, a precise method and means for determining the velocity of a fast-moving platform. This, of course, is an exceedingly valuable coincidental feature, if the aforesaid fast-moving platform happens to be a hydrofoil boat that is traveling in uncharted waters.

It is, therefore, an object of this invention to provide an improved echo-search-ranging system.

Another object of this invention is to provide an improved doppler sonar system.

Still another object of this invention is to provide an improved method and means for detecting, identifying, and range determining objects floating on the surface of or submerged within water, sea water, or the like, in or on which a rapidly moving marine vehicle is running.

A further object of this invention is to provide an improved signal-to-noise ratio, doppler-compensated sonar which facilitates the avoidance of logs, debris, and other hazards occurring in the water in which a vehicle containing it is traveling.

A further object of this invention is to provide an improved method and means for automatically tracking a doppler-shifted reverberation spectrum.

A further object of this invention is to provide an improved method and means for precisely measuring the velocity of mobile platforms, such as hydrofoil boats, ships, submarine boats, air cushion vehicles, air crafts, space crafts, land crafts, and the like.

Still another object of this invention is to provide a sonar system that facilitates the navigation of marine vehicles and crafts through uncharted waters.

Another object of this invention is to provide an improved method and means for doppler compensating an echo-search-ranging system, such as, for example, a sonar system employed in operational situations involving relatively moving objects, regardless of whether it happens to be designed as an active or passive sonar system.

Another object of this invention is to provide an improved phase lock loop circuit.

Another object of this invention is to provide an improved method and means for preventing a moving vehicle from running into or having a collision with another object or vehicle, be it stationary or moving, and thereby improve the safety of operation of both thereof.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a block diagram of a preferred embodiment of the sonar system constituting this invention; and FIG. 2 is a quasi-pictorial illustration of an operational situation where the sonar system of FIG. 1 can be used to an advantage.

DESCRIPTION OF THE PREFERRED EMBODIMENT

Referring now to FIG. 1, a doppler compensated sonar system 11 is depicted. For the purpose of emphasis, it should perhaps be mentioned again that the subject invention is primarily intended to be designed to be a sonar system. Nevertheless, if it is so desired, it would again appear to be noteworthy that it could also be designed as, say, a radar system, an infrared search system, or any other echo-search-ranging system, including most other sonar systems, be they active or passive.

Accordingly, sonar system 11 of FIG. 1 is disclosed as having a reversible (that is, having an input-output) electroacoustical transducer 12 which is adapted for broadcasting acoustical energy throughout its ambient environmental medium—water in this case—in response to and proportional to an electrical signal supplied thereto, and for producing an electrical output signal proportional to a received acoustical signal from within said ambient environmental medium.

In this particular case, it may be seen in FIG. 1 that transducer 12 broadcasts acoustical energy 13 throughout water 14 where it acquires a target or debris 15—such as boats, logs, submerged tree stumps, rocks, or other objects—from which it is reflected as an echo signal 16 back toward transducer 12.

The input-output of transducer 12 is connected to the input-output of a transmit-receive (TR) switch 17, which, of course, is the conventional device that prevents the signals generated by a transmitter 18 portion of the invention from being received by a receiver 19 portion during the time the target search signals are being broadcast by transducer 12. Of course, said conventional transmit-receive switch has a data signal input which is connected to the output of the aforementioned transmitter 18 and a data signal output that is connected to the input of the aforesaid receiver 19.

As may readily be seen, transmitter 18 comprises an adjustable frequency signal generator 21, which, in this particular instance, will be considered as having been set to generate a pulsed CW signal having a train of sine waves at an operating frequency of 100 KHz and a train length of 5 milliseconds. The output of signal generator 21 is connected to the input of an adjustable power amplifier 22. The output of power amplifier 22, in fact, constitutes the output of transmitter 18 and is connected to the data signal input of the aforementioned transmit-receive switch 17.

The data signal output of transmit-receive switch 17 is, in fact, connected to the input of a variable preamplifier 23 of receiver 19, with the output thereof connected to the input of a time-varied-gain (T.V.G.) amplifier 24.

The output of time-varied-gain amplifier 24 is connected to one of the inputs of a mixer 25, which should be considered as, in actuality, being a part of two circuits, viz., receiver circuit 19 and a doppler compensating phase lock loop circuit 26, the latter of which, being a key component of the instant invention, will be discussed in considerable detail subsequently.

The output of mixer 25 is connected to the input of an intermediate frequency (I.F.) amplifier 27 designed in this particular instance for operational amplification at a frequency of 31.2 KHz, and the output of intermediate frequency amplifier 27 is connected to the input of a bandpass filter 28 that has been designed to be centered at and thus have its maximum response to a fixed frequency of 31.2 KHz. The bandwidth of this filter should be chosen so as to have a band equal to 1/P.L., where P.L. is the length of the pulsed CW signal. In this particular case, such bandwidth is equal to 1/P.L., which is the reciprocal of 5 milliseconds or 200 Hz.

The output of bandpass filter 28 is connected to another 31.2 KHz intermediate frequency (I.F.) amplifier 29, with the output thereof connected to the input of an envelope detector 31, the output of which is connected to the input of an adjustable output power amplifier 32.

The output of amplifier 32 is connected to the input of an adjustable thresholder 33, the output of which is connected to the data signal input of any suitable readout, such as, for example, an oscilloscope video display 34. For the purpose of synchronizing the beginning of the broadcast of the target search signal with video display 34, so that target range information will be indicated thereby, the output of power amplifier 22 of transmitter 18 is connected to sweep trigger input thereof, as is conventional in the sonar art.

For the purposes of this invention, thresholder 33 has been shown as being separate and self-contained; however, it should be understood that it may be an included component of video display 34 or any other readout, if so desired. Therefore, the selfcontained, separate embodiment thereof should be considered as being optional, with the selection thereof being a matter of design choice of the artisan. Obviously, it would be well within the purview of one skilled in the art having the benefit of the teachings presented herewith to select whatever thresholder arrangement would be optimum for any given set of component and operational circumstances.

As indicated above, the phase lock loop part of the invention is an important sub-system or component thereof. In this particular preferred embodiment, it comprises an adjustable, crystal controlled reference oscillator 35 that is set to generate a 31.2 KHz signal at the output thereof, which is connected to one of the inputs of a phase detector 36, the output of which, in turn, is connected to the input of a low pass filter 37 that has been designed to block the 31.2 KHz signal and pass the lower sideband or the difference signal between 31.2 KHz and the other signal—that is, the error signal, as it will be discussed later—supplied to the other input of phase detector 36 by a hard limiter 38.

The output of low pass filter 37 is connected to the control input of a voltage controlled oscillator (V.C.O.) 39, the output of which is connected to the other input of mixer 25. For reasons which will be obvious later, V.C.O. 39 has been calibrated and set to produce an output signal having a 68.8 KHz for a zero voltage signal supplied thereto. Of course, the output of mixer 25 is also connected to the input of the aforesaid hard limiter 38, to thereby complete the loop of phase lock loop circuit 26. Hard limiter 38 is of the type that restricts the amplitude of the signal supplied thereto to a constant value, before passing it along to phase detector 36. And voltage controlled oscillator 39 increases the frequency of the signal supplied thereto in proportion to the error voltage before, in turn, supplying it to mixer 25.

The output of voltage controlled oscillator 39 is also connected to one of the inputs of another mixer 41 of an indicator circuit 42. An adjustable oscillator 43, set in this instance to produce a 68.8 KHz signal, is connected to the other input of mixer 41. A low pass filter 44 is connected to the output of mixer 41, with the output thereof connected to the input a frequency counter 45 that has been calibrated to read out as a speed indicator for a carrier vehicle 46 on which the subject sonar system 11 is mounted.

At this time, it would appear to be noteworthy that carrier vehicle 46 may be any of many different types. In the preferred embodiment disclosed herein, it happens to be a high-speed hydrofoil boat (such as that schematically depicted in FIG. 2); however, it should be understood that it may be other mobile vehicles, too—such as, for instance, a ship, a submarine boat or other underwater vehicle, an air cushion vehicle, an aircraft, a space craft, a land craft or vehicle, or the like. Furthermore, it should be obvious that the environmental mediums within which they operate may be water, sea water, or some other appropriate medium, respectively, which are normal for their respective operational characteristics. Obviously, the type of carrier vehicle involved and the particular environmental medium or mediums within which it is traveling would be taken into consideration by the artisan making and using the invention. And, of course, it would be well within the purview thereof to make such design choices as would be necessary to make in order to construct and use whatever embodiment would be necessary for any given operational circumstances, once he had the benefit of the teachings presented herewith.

In addition, it would appear to be worthy of note that all of the components illustrated in block form in the drawing are well known and conventional per se; consequently, it is their unique interconnections and interactions that cause them to result in the new and useful combination of elements constituting this invention.

Referring now to FIG. 2, ar exemplary manner in which the invention of FIG. 1 may be used to an advantage is shown. Therefore, without any limitation intended, hydrofoil boat 46 is shown as traveling fast enough from right to left through water 51 to be lifted up on its forward and rearward hydrofoils 52 and 53. Extending therefrom—by any appropriate support means—is the aforementioned transducer 12 which broadcasts and receives search acoustical and target reverberation or echo signals 13 and 16, respectively, with the latter being received from objects that lie in the path of or substantially in the path of hydrofoil boat 46. Of course, although not shown in FIG. 2, hydrofoil boat 46 carries the aforementioned transmitter 18, receiver 19, phase lock loop 26 depicted in FIG. 1, and all apparatus associated therewith that is necessary or desirable for the operation thereof to be effective as doppler compensated sonar system 11.

Again, without limitation intended, the following objects have been illustrated as being possible hazards to boat 46 which are acquired by sonar 11 to thereby implement the safe running thereof along its navigated course: a log 54 floating on the surface of water 51; a marine mine 55 laying on, buried within, or partially buried within sea floor 56, another marine mine 57 floated to some intermediate water depth position as a result of being anchored by an anchor 58 and a tether line 59; a boat 61, such as a sail boat or other slow moving boat, ship, or craft that might otherwise be invisible due to darkness, fog, or the like; a large rock 62 (or shallow place, on which boat 46 could run aground); a submerged tree stump 63 that is not visible from the surface of the water or from boat 46; or any other hazardous object that could cause damage to said boat 46, if not seen by the crew thereof.

Of course, in addition to locating and indicating objects in the path of boat 46 that could be hazardous thereto, the subject sonar 11 may also be used to an advantage to locate other objects or targets (not shown), the presence of which is desired to be known for other reasons. One example of such situation would be the location of people and things during search and rescue work; another example might be the location of swimmers—human, animal, fish, or otherwise.

MODE OF OPERATION

The operation of the subject invention will now be discussed briefly, with reference to some specifically disclosed values and parameters (but without limitation thereto), since it is believed that so doing will facilitate and expedite the understanding thereof in this particular instance.

As previously mentioned, carrier vehicle or hydrofoil vehicle 46 is running at relatively high speed along a predetermined course in water 51. Because of its speed, all hazardous objects and debris should be avoided if at all possible, in order to prevent collision therewith, which might cause damage to the hydrofoils or other parts of the boat. Therefore, to optimize the safety of operation thereof, the subject invention is incorporated therein and used during such high-speed and other running conditions.

As hydrofoil boat 46 travels along its course, sonar 11—by means of signal generator 21, power amplifier 22, and transmitreceive switch 17—causes search signals 13 to be broadcast throughout the water in front thereof. Echoes 16 of said search signals are then timely received from targets and objects in the path thereof, as is customary in the sonar art. Of course, as is also conventional in the sonar art, transmit-receive switch 17 allows signals to pass from power amplifier 22 of transmitter 18 to transducer 12, while blocking said same signals to pre-amplifier transmit-receive switch 17 allows the received signals to pass from transducer 12 to said pre-amplifier 23 without interference with transmitter 18.

More specifically, in this particular case, as previously suggested, signal generator 21 generates a pulsed CW signal having a train of sine waves at an operating frequency of 100 KHz and a train length of 5 milliseconds. This pulsed CW signal is amplified to a more useful level by power amplifier 22. Transmitreceive switch 17 is switched to the transmit mode, allowing the amplified pulsed CW signal to excite transducer 12, the latter of which converts the electrical pulsed CW signal into acoustical signals proportional thereto and radiates them as waves within the water. Said radiated waves travel outwardly from transducer 12, and any discontinuities in the water made by such things as fish, logs, entrapped air, or the like, or any discontinuities occurring at the water interfaces or boundaries (that is, surface or sea floor) cause a portion of said sound waves to be reflected back toward the point from which they were first radiated. The specific discontinuities which are considered herewith as being of considerable importance are those particles dispersed in the water (entrapped air, suspended matter, etc.) which cause a volume reverberation echo or the water-air and water-bottom interfaces, which produce an echo commonly referred to as being surface and bottom reverberations.

In the event boat 46 happens to be stationary, the reflected CW energy will have the same frequency as that of the radiated search signal; however, if boat 46 is in motion, then a frequency shift will occur that is proportional to its speed, velocity of acoustical energy propagation in the water, and frequency of the radiated sound. For instance, for a water medium, it can be shown that a frequency shift or doppler of 0.62 Hz per knot per KHz will occur; and, for example, for a boat speed of 65 knots and an operating frequency of 100 KHz, a doppler frequency shift of 4000 Hz will occur with respect to stationary target objects located in the water.

As one of the primary objectives of the subject sonar is to detect and avoid hazards located at or just below the water, and since the surface reverberation and such floating hazards have the same relative velocity with respect to boat 46, then if the frequency of said surface reverberation is tracked, the reflected acoustical echoes from such hazards will have the same frequency. Thus, by automatically centering the band of receiver filter 28 around that frequency, the hazardous objects are readily detected. Such automatic tracking of the reverberation frequency spectrum is one of the keys to the unique operation of the invention.

Because the speed of boat 46 may change from zero (dead in the water) to the maximum speed attainable, the frequency (or phase) of the doppler shifted reverberation continuously changes in like manner. Hence, it continually changes during the acceleration of the boat, and during the deceleration thereof, as well. This change in frequency is detectable and can be used to automatically adjust receiver 17, such that the return target echo signal will remain in the center of narrow band, bandpass filter 28.

Then, still referring to FIG. 1, upon return of pulsed CW sound wave 16, it will be converted into an electrical signal proportional thereto by transducer 12. With transmit-receive switch 17 now in the receive mode, said received equivalent electrical signal is amplified to a more useful level by pre-amplifier 23, and further increased in magnitude by time-varied-gain amplifier 24 (in the conventional TVG manner) before being supplied to mixer 25. Of course, mixer 25 serves to mix the output signal from voltage controlled amplifier 29 with said return echo signal.

The beat or difference frequency (from mixer 25) of said two signals is intended to remain constant at 31.2 KHz in this particular embodiment of the invention, and, thus, in effect, 31.2 KHz becomes the control point frequency. Of course, this beat frequency naturally occurs when boat 46 is not moving, because no doppler is present at that time. This may be calculated for no target-boat relative motion by: (1) Considering the return echo signal as having a 100 KHz frequency because the transmitted signal is equal to that generated by signal generator 21, which was previously defined as having been set at 100 KHz, (2) that voltage control oscillator 39 has been set to produce a 68.8 KHz signal at zero voltage input thereto, and (3) that reference oscillator 35 generates a 31.2 KHz signal. Then, if the output of mixer 25 is 31.2 KHz, when effectively subtracted from the 31.2 KHz of reference oscillator 35 in the phase detector 36 and low pass filter 37 combination, the difference therebetween (that is, the lower side band) is zero voltage supplied to the input of VCO 39, thereby causing it to supply a 68.8 KHz signal to mixer 25. Then, 100 KHz−68.8 KHz=31.2 KHz. In other words, since no phase difference exists in such case between the output signal from mixer 25 and reference oscillator 35, no error voltage exists, thus no voltage is supplied to VCO 39, and 68.8 KHz is mixed with 100 KHz to produce a difference signal of 31.2 KHz, the calibrated set point frequency. Consequently, phase lock loop 26 remains in a quiescent state for a no movement boat condition.

When boat 43 moves and the speed thereof increases, the frequency of the return reverberation signal also increases in proportion therewith. As the return frequency increases, a 360 degree phase shift occurs for each Hz increase. It is this phase change that is immediately sensed or detected (via hard limiter 38) by phase detector 36, whereby it produces a D.C. voltage that is proportional thereto, herein defined as the D.C. error voltage. This D.C. error voltage is then passed through low pass filter 37 which, of course, blocks the 31.2 KHz fundamental frequencies.

This D.C. error voltage is then applied to voltage controlled oscillator 39, which, in turn, increases its output signal frequency in proportion thereto and, at the same time, increases it to a value such that the difference frequency between it and the return echo signal is kept constant at 31.2 KHz. Of course, this frequency adjusting (increasing) continues as long as boat 43 is accelerating to its desired constant velocity. The time constants of phase lock loop 36 should be designed so that a constant lock occurs for every value of acceleration, if optimum operation thereof is to be obtained, although it is recognized that some small amount of hunting may occur about the 31.2 KHz control point frequency.

The corrected signal having a frequency of 31.2 KHz, in this case, is supplied to intermediate frequency amplifier 27, where it is further refined and amplified to a more useful level before being supplied to band pass filter 28. Band pass filter 28 is preferably chosen to have its center of maximum response at the fixed frequency of 31.2 KHz and its bandwidth equal to 1/PL, where PL is the length of the pulsed CW search signal. Thus, in this example, it would be equal to 1/P.L., which is the reciprocal of 5 milliseconds or 200 Hz.

After passing through band pass filter 28, the received signal is passed through another intermediate frequency amplifier 29 for further refinement and amplification, after which the envelope thereof is detected by envelope detector 31. Again, it is amplified to a more useful level by adjustable power amplifier 32, before being supplied to thresholder 33 and video display 34.

Thresholder 34 is of the type that may be adjusted, so that only received target echo signals having an amplitude above a certain noise level will be displayed by video display 34, thereby eliminating many false targets that would perhaps otherwise cloud the target display picture.

As previously mentioned, the sweep of video display 34 is triggered by transmitter 18, so that the time and distance interval on the scope thereof between transmit and received signals represents range to the acquired targets.

Because the frequency of the output signal from voltage controlled oscillator is proportional to the speed of boat 46, this frequency can be processed to indicate such speed. Detector 42 performs such function. It comprises crystal controlled oscillator 43 that has been set to produce a 68.8 KHz, which is mixed with the frequency of the output signal from VCO 39 to, in turn, produce a signal including the lower side band or beat frequency thereof. This beat frequency is separated out by low pass filter 44 and supplied to frequency counter 45. Of course, because said beat frequency is proportional to boat speed, frequency counter 45 may be calibrated in terms of velocity and, thus, directly indicate the speed of boat 46 in knots or some other parameter.

In the foregoing embodiment, only one receiver channel—that is, receiver 19—is disclosed as being preferable; however, it should be understood that any number thereof may be employed, along with a suitable system for timely scanning the outputs thereof, if so desired. But, because the preferred embodiment described herein very effectively uses the aforesaid reverberation signals to adjust the single receiver channel, such that the processed received echo signals always lie within the fixed narrow frequency band thereof, the resulting accuracy, fidelity, and overall performance is such that incorporation of additional channels is unnecessary and undesirable. Hence, as disclosed, the subject invention constitutes a worthwhile advancement in the doppler sonar art.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar system, comprising in combination:
    means for broadcasting an acoustical target search signal throughout a predetermined portion of an aqueous medium;
    means effectively synchronized with said broadcasting means for receiving the aforesaid acoustical target search signal after it has been reflected as an echo signal from a target located within said aqueous medium and for converting it into a first electrical signal that is proportional thereto;
    means connected to the output of said reflected echo signal receiving and converting means for mixing the first electrical signal therefrom with a second electrical signal supplied thereto, so as to produce a third electrical signal at the output thereof that contains the lower side band frequency difference between said first and second electrical signals;
    means effectively connected to the output of said mixing means for filtering said third electrical signal in such manner as to pass substantially the lower side band frequency signal thereof therethrough;
    means effectively connected to the output of said filtering means for reading out said lower side band frequency signal in terms of the targets acquired by the aforesaid search signal;
    means connected between the output and the other input of said mixing means for adjusting the frequency of said second electrical signal supplied to the other input thereof in such manner as to compensate for any relative movement between the aforesaid receiving and converting means and said target, so as to keep the frequency of said third electrical signal substantially constant.

2. The system of claim 1, wherein said means for broadcasting an acoustical target search signal throughout a predetermined portion of an aqueous medium comprises:
    an adjustable frequency signal generator; and
    a reversible electroacoustical transducer effectively connected to the output of said adjustable frequency signal generator.

3. The system of claim 1, wherein said means effectively synchronized with said broadcasting means for receiving the aforesaid acoustical target search signal after it has been reflected as an echo signal from a target located within said aqueous medium and for converting it into a first electrical signal that is proportional thereto comprises:
    a reversible electroacoustical transducer;
    a preamplifier effectively connected to the output of said reversible electroacoustical transducer; and
    a time-varied-gain amplifier connected to the output of said pre-amplifier.

4. The system of claim 1, wherein said means connected to the output of said reflected echo signal receiving and converting means for mixing the first electrical signal therefromwith a second electrical signal supplied thereto, so as to produce a third electrical signal at the output thereof that contains the lower side band frequency difference between said first and second electrical signals comprises a mixer.

5. The system of claim 1, wherein said means effectively connected to the output of said mixing means for filtering said third electrical signal in such manner as to pass substantially the lower side band frequency signal thereof therethrough comprises a bandpass filter having a center frequency that is substantially equal to the lower side band frequency of said third electrical signal.

6. The system of claim 1, wherein said means effectively connected to the output of said mixing means for filtering said third electrical signal in such manner as to pass substantially the lower side band frequency signal thereof therethrough comprises a bandpass filter having its center of maximum response at the frequency that is substantially equal to the frequency of the lower side band of said third electrical signal and a bandwidth substantially equal to 1/PL, where PL is the train length of the search signal in milliseconds.

7. The system of claim 1, wherein said means effectively connected to the output of said filtering means for reading out said lower side band frequency signal in terms of the targets acquired by the aforesaid search signal comprises an oscilloscope video display.

8. The system of claim 1, wherein said means connected between the output and the other input of said mixing means for adjusting the frequency of said second electrical signal supplied to the other input thereof in such manner as to compensate for any relative movement between the aforesaid receiving and converting means and said target, so as to keep the frequency of said third electrical signal substantially constant comprises:
    a hard limiter connected to the output of said mixing means;
    a phase detector having a pair of inputs and an output, with one of the inputs thereof connected to the output of said hard limiter;
    an adjustable reference oscillator, with the output thereof connected to the other input of said phase detector;
    a low pass filter connected to the output of said phase detector; and a voltage controlled oscillator connected between the output of said low pass filter and the other input of the aforesaid mixing means.

9. The system of claim 1, further characterized by means connected to the output of said last mentioned second electrical signal frequency adjusting means for reading out said second electrical signal in terms of relative speed between the aforesaid receiving and converting means and said target.

10. The system of claim 9, wherein said means connected to the output of said last mentioned second electrical signal frequency adjusting means for reading out said second electrical signal in terms of relative speed between the aforesaid receiving and converting means and said target comprises:
  an adjustable frequency oscillator;
  a mixer having a pair of inputs and an output, with one of the inputs thereof connected to the output of said adjustable frequency oscillator, and with the other input thereof connected to the output of said adjusting means for response to the second electrical signal therefrom;
  a low pass filter connected to the output of said mixer; and
  a frequency counter, calibrated in terms of relative speed between the aforesaid receiving and converting means and said target, connected to the output of the aforesaid low pass filter.

11. The system of claim 1, further characterized by carrier vehicle means disposed in said aqueous medium for supporting said sonar system.

12. The system of claim 11, wherein said carrier vehicle means is a hydrofoil boat.

13. The system of claim 11, wherein said carrier vehicle means is a ship.

14. The system of claim 11, wherein said carrier vehicle means is a submarine boat.

15. The system of claim 1, wherein said carrier vehicle means is an air cushioned craft.

16. An echo-ranging-search system adapted for being mounted on a carrier vehicle that is capable of moving in a predetermined environmental medium, comprising in combination:
  means for broadcasting a predetermined target search signal within the aforesaid predetermined environmental medium;
  means effectively synchronized with said broadcasting means for receiving the aforesaid predetermined target search signal after it has been reflected as an echo signal from a target located within said predetermined environmental medium and for converting it into a first electrical signal that is proportional thereto;
  means connected to the output of said reflected echo signal receiving and converting means for mixing the first electrical signal therefrom with a second electrical signal supplied thereto, so as to produce a third electrical signal at the output thereof that contains the lower side band difference frequency between said first and second electrical signals;
  means effectively connected to the output of said mixing means for filtering said third electrical signal in such manner as to pass substantially the lower side band frequency signal thereof therethrough;
  means effectively connected to the output of said filtering means for reading out said lower side band frequency signal in terms of the targets from which the aforesaid echo signal is reflected; and
  means connected between the output and the other input of said mixing means for adjusting the frequency of said second electrical signal supplied to the other input thereof in such manner as to compensate for any doppler effects that occur therein due to any relative movement between the aforesaid receiving and converting means and said target, so as to maintain said third electrical signal at a substantially constant frequency.

17. A sonar system, mounted on a carrier vehicle that is disposed for movement in a body of water, for detecting and indicating objects located in said body of water in the path of said carrier vehicle as it moves therethrough, comprising in combination:
  a reversible electroacoustical transducer having an input-output;
  a transmit-receive switch, having an input-output, an input, and an output, with the input-output thereof connected to the input-output of said reversible electroacoustical transducer;
  a pre-amplifier connected to the output of said transmit receive switch;
  a time-varied-gain amplifier connected to the output of said pre-amplifier;
  a mixer having a pair of inputs and an output, with one of the inputs thereof connected to the output of said time varied-gain amplifier;
  a first intermediate frequency amplifier connected to the output of said mixer;
  a band pass filter connected to the output of said first intermediate frequency amplifier;
  a second intermediate frequency amplifier connected to the output of said band pass filter;
  an envelope detector connected to the output of said second intermediate amplifier;
  an adjustable power amplifier connected to the output of said envelope detector;
  an adjustable thresholder connected to the output of said adjustable power amplifier;
  an oscilloscope video display having a data signal input and a sync input, with the data signal input thereof connected to the output of the aforesaid thresholder;
  an adjustable frequency reference oscillator;
  a phase detector having a pair of inputs and an output, with one of the inputs thereof connected to the output of said adjustable frequency reference oscillator;
  a hard limiter connected between the output of the aforesaid mixer and the input of said phase detector;
  a low pass filter connected to the output of said phase detector; and
  a voltage controlled oscillator connected between the output of said low pass filter and the other input of the aforesaid mixer.

18. The invention of claim 17, further characterized by: another adjustable frequency oscillator;
  another mixer having a pair of inputs and an output, with one of the inputs thereof connected to the output of said another adjustable frequency oscillator, and with the other input thereof connected to the output of the aforesaid voltage controlled oscillator;
  a low pass filter connected to the output of said another mixer; and
  a frequency counter that is calibrated in terms of speed of the aforesaid carrier vehicle with respect to the body of water in which it is moving connected to the output of said low pass filter.

* * * * *